United States Patent
Bos et al.

[11] Patent Number: 5,886,960
[45] Date of Patent: Mar. 23, 1999

[54] OPTICAL DISC SYSTEM USING MULTIPLE OPTICAL HEADS FOR ACCESSING INFORMATION DATA

[75] Inventors: Eric Rene Bos, Fountain Valley; Robert L. Montelius, Jr., Laguna Hills, both of Calif.

[73] Assignee: MultiDisc Technologies, Laguna Hills, Calif.

[21] Appl. No.: 964,085

[22] Filed: Nov. 4, 1997

[51] Int. Cl.[6] .................................................. G11B 17/22
[52] U.S. Cl. .............................................. 369/32; 369/49
[58] Field of Search ................................ 369/32, 49, 33, 369/48, 30, 54, 94

[56] References Cited

U.S. PATENT DOCUMENTS

| | | |
|---|---|---|
| 1,858,396 | 5/1932 | Fey . |
| 4,527,262 | 7/1985 | Manto ........................................ 369/33 |
| 4,567,584 | 1/1986 | Kawakami ................................. 369/38 |
| 4,589,101 | 5/1986 | Schatteman et al. ....................... 369/38 |
| 4,607,354 | 8/1986 | Ishibashi et al. ........................... 369/39 |
| 4,614,474 | 9/1986 | Sudo ........................................ 414/281 |
| 4,664,454 | 5/1987 | Schatteman et al. ....................... 312/13 |
| 4,682,320 | 7/1987 | D'ALayer De Costemore D'Arc 369/77.1 |
| 4,701,899 | 10/1987 | D'Alayer De Costemore D'Arc .. 369/36 |
| 4,734,814 | 3/1988 | Fujino et al. .............................. 360/133 |
| 4,754,397 | 6/1988 | Varaiya et al. ............................ 364/200 |

(List continued on next page.)

FOREIGN PATENT DOCUMENTS

| | | |
|---|---|---|
| 66317B1 | 12/1982 | European Pat. Off. . |
| 284445A1 | 9/1988 | European Pat. Off. . |
| 288165A2 | 10/1988 | European Pat. Off. . |
| 516496A2 | 12/1992 | European Pat. Off. . |
| 542482A2 | 5/1993 | European Pat. Off. . |
| 550282A2 | 7/1993 | European Pat. Off. . |
| 589479A2 | 3/1994 | European Pat. Off. . |
| 662687A1 | 7/1995 | European Pat. Off. . |
| 779619A2 | 12/1996 | European Pat. Off. . |
| 2538597A1 | 12/1983 | France . |
| 3927901A1 | 2/1991 | Germany . |
| 4313373A1 | 11/1993 | Germany . |
| 4314387A1 | 11/1994 | Germany . |
| 19530162A1 | 2/1997 | Germany . |
| 60-106250 | 7/1985 | Japan . |
| 62-239391 | 10/1987 | Japan . |
| 63-237256 | 10/1988 | Japan . |
| 6435758 | 2/1989 | Japan . |
| 166649 | 4/1989 | Japan . |
| 1158667 | 6/1989 | Japan . |
| 2244456 | 9/1990 | Japan . |
| 4341968 | 11/1992 | Japan . |
| 5234228 | 9/1993 | Japan . |
| 579749 | 10/1993 | Japan . |
| 684265A | 3/1994 | Japan . |
| 6195838 | 7/1994 | Japan . |
| 684546 | 12/1994 | Japan . |
| 8273268 | 10/1996 | Japan . |
| 955009 | 2/1997 | Japan . |
| 9167405 | 6/1997 | Japan . |
| 9167410 | 6/1997 | Japan . |
| 9167412 | 6/1997 | Japan . |
| 1028P0513 | 10/1997 | Japan . |
| 2286715 | 2/1995 | United Kingdom . |

*Primary Examiner*—Tan Dinh
*Attorney, Agent, or Firm*—Stetina Brunda Garred & Brucker

[57] ABSTRACT

A disc optics system for accessing data from one side of a disc is provided with a plurality of optics sets. The optics sets are formed to access data from a disc in response to a control signal and generate a data signal representative of accessed data. The optics sets are positioned at radially variable portions of one side of a disc. The disc optics system is further provided with a multiplexer. The multiplexer is formed to receive data signals from the plurality of optics sets and to selectively output a single data signal in response to a selection signal. The disc optics system is further provided with a controller. The controller is formed to output a control signal to the plurality of optics sets for selectively accessing data from the disc and cause the multiplexer to selectively output a single data signal.

9 Claims, 2 Drawing Sheets

U.S. PATENT DOCUMENTS

| | | | |
|---|---|---|---|
| 4,817,070 | 3/1989 | Hug et al. | 369/36 |
| 4,839,758 | 6/1989 | Honjoh | 360/99.06 |
| 4,853,916 | 8/1989 | Tomita | 369/36 |
| 4,855,980 | 8/1989 | Hug et al. | 369/36 |
| 4,891,720 | 1/1990 | Grant et al. | 360/92 |
| 4,912,575 | 3/1990 | Shiosaki | 360/71 |
| 4,945,430 | 7/1990 | Konishi et al. | 360/92 |
| 4,969,140 | 11/1990 | Koiwa et al. | 369/77.1 |
| 4,972,396 | 11/1990 | Muller | 369/32 |
| 4,979,160 | 12/1990 | Araki | 369/75.2 |
| 4,988,038 | 1/1991 | Mitsuyama | 229/1.5 R |
| 5,001,582 | 3/1991 | Numasaki | 360/98.06 |
| 5,020,043 | 5/1991 | Kohler | 369/36 |
| 5,022,019 | 6/1991 | Motoyoshi et al. | 369/36 |
| 5,036,503 | 7/1991 | Tomita | 369/36 |
| 5,041,929 | 8/1991 | Fryberger et al. | 360/92 |
| 5,045,958 | 9/1991 | Leonard et al. | 360/92 |
| 5,056,077 | 10/1991 | Morikawa et al. | 369/77.1 |
| 5,058,100 | 10/1991 | Yoshii | 369/291 |
| 5,064,069 | 11/1991 | Su | 206/425 |
| 5,067,116 | 11/1991 | Kadrmas | 369/37 |
| 5,091,898 | 2/1992 | Bessho et al. | 369/77.2 |
| 5,128,912 | 7/1992 | Hug et al. | 369/38 |
| 5,136,562 | 8/1992 | Staar | 369/36 |
| 5,146,451 | 9/1992 | Kang | 369/270 |
| 5,157,646 | 10/1992 | Amemiya et al. | 369/47 |
| 5,161,137 | 11/1992 | Suzuki | 369/32 |
| 5,161,682 | 11/1992 | Seifert et al. | 206/309 |
| 5,173,894 | 12/1992 | Kido | 369/77.1 |
| 5,187,695 | 2/1993 | Schindler et al. | 369/37 |
| 5,189,656 | 2/1993 | Masaki et al. | 369/47 |
| 5,191,983 | 3/1993 | Hardy | 211/40 |
| 5,195,066 | 3/1993 | Amemiya et al. | 369/32 |
| 5,197,056 | 3/1993 | Van Heusden et al. | 369/37 |
| 5,206,845 | 4/1993 | Baxter et al. | 369/34 |
| 5,210,728 | 5/1993 | Noguchi et al. | 369/36 |
| 5,214,628 | 5/1993 | Langman et al. | 369/37 |
| 5,216,645 | 6/1993 | Sakayama | 369/36 |
| 5,218,583 | 6/1993 | Miyajima | 369/36 |
| 5,228,016 | 7/1993 | Menke | 369/36 |
| 5,235,579 | 8/1993 | Ross | 369/37 |
| 5,247,500 | 9/1993 | Miyoshi et al. | 369/38 |
| 5,255,251 | 10/1993 | Fitzgerald et al. | 369/36 |
| 5,255,255 | 10/1993 | Kaneda et al. | 369/77.1 |
| 5,263,010 | 11/1993 | Amemiya et al. | 369/47 |
| 5,267,225 | 11/1993 | Fukasawa et al. | 369/36 |
| 5,274,620 | 12/1993 | Sipos | 369/77.2 |
| 5,285,333 | 2/1994 | Barr et al. | 360/92 |
| 5,289,441 | 2/1994 | Domberg et al. | 369/34 |
| 5,327,412 | 7/1994 | Lee | 369/75.2 |
| 5,353,269 | 10/1994 | Kobayashi et al. | 369/36 |
| 5,370,243 | 12/1994 | Rosario | 211/40 |
| 5,373,489 | 12/1994 | Sato et al. | 369/36 |
| 5,429,470 | 7/1995 | Nicol et al. | 414/331 |
| 5,431,520 | 7/1995 | Brugger | 414/277 |
| 5,446,714 | 8/1995 | Yoshio et al. | 369/48 |
| 5,448,539 | 9/1995 | Kamioka | 369/32 |
| 5,473,585 | 12/1995 | Kim | 369/36 |
| 5,481,514 | 1/1996 | Yamasaki et al. | 369/36 |
| 5,485,436 | 1/1996 | Forget et al. | 369/36 |
| 5,488,593 | 1/1996 | Furumiya et al. | 369/32 |
| 5,493,548 | 2/1996 | Kamioka | 369/49 |
| 5,506,825 | 4/1996 | Gushima et al. | 369/49 |
| 5,513,156 | 4/1996 | Hanaoka et al. | 369/34 |
| 5,539,712 | 7/1996 | Menke et al. | 369/36 |
| 5,544,148 | 8/1996 | Nakamichi | 369/192 |
| 5,546,366 | 8/1996 | Dang | 369/36 |
| 5,548,567 | 8/1996 | Sawai | 369/36 |
| 5,561,657 | 10/1996 | Ogawa | 369/179 |
| 5,561,658 | 10/1996 | Nakamichi et al. | 369/263 |
| 5,576,911 | 11/1996 | Porter | 360/98.06 |
| 5,610,882 | 3/1997 | Dang | 369/36 |
| 5,613,745 | 3/1997 | Cho et al. | 312/9.9 |
| 5,638,347 | 6/1997 | Baca et al. | 369/34 |
| 5,715,948 | 2/1998 | Hung | 211/40 |
| 5,720,386 | 2/1998 | Allsop et al. | 206/308.1 |
| 5,754,508 | 5/1998 | Hosoda et al. | 369/49 |
| 5,768,243 | 6/1998 | Kudo et al. | 369/49 |

OPTICAL DISC SYSTEM USING MULTIPLE OPTICAL HEADS FOR ACCESSING INFORMATION DATA

FIELD OF THE INVENTION

This invention generally relates to disc reading systems, and in particular to a disc reading system having multiple multiplexed optics sets.

BACKGROUND OF THE INVENTION

Compact discs for storing a wide variety of data types (e.g., audio, text, images, etc.) are well known in the art. As used herein, the terms "compact disc" and "disc" are defined to include all such devices, including but not limited to, CD-ROM, WORM, DVD (digital versatile disc), DVD-RAM, CD-WO (CD-Write Once), CD-R (CD-Recordable) etc. Methods and apparatus for efficient access to data stored on these discs are a significant factor for consideration in view of the proliferation of use of these discs for data storage in association with computerized information that must be readily available.

A system planner must address disc loading and retrieval, the provision of drive, data access, support and control components, and the interconnection of all elements for efficient operation. In a conventional system, a control unit operates to determine the location of a desired data block stored on a given disc. The control unit sends a control signal to the drive unit to access the desired data block. In order to facilitate data access, the drive unit initially operates to rotate the disc, which may be initially at rest, at a specified frequency. The drive unit then moves an optics set along the surface of the disc and positions the optics set adjacent the lead-in for the particular data block to be read.

It is common for Table-of-Contents (TOC) data, together with data desired to be reproduced, to be stored on a disc. The disc system may make use of Table-of-Contents (TOC) data stored on a disc to facilitate generating the control signal. The control unit directs the drive unit, via the control signal, to position the optics set to selectively access desired data. The TOC information contains various inherent data relative to the information recorded on the disc, such as the number of data blocks recorded on the disc, and the relative size of each data block, the positional address of each data block, for example. Thus, TOC data is useful for facilitating efficient access to desired data blocks. Otherwise, for example, in order for the controller to determine where data blocks are located, the entire disc would have to be read.

The time associated with causing the disc to begin rotating until the specified frequency of rotation is achieved (i.e., spin-up time) substantially slows access to the desired data. In addition, the time associated with properly positioning the optics set adjacent desired data on the disc consequently slows access to the desired data.

Furthermore, a sequence of data blocks may be stored at various portions of a disc. Thus, a desired data block may be located at one portion of the disc, the subsequently desired data block may be located at another portion, and so forth. Thus, the cumulative time associated for properly positioning and repositioning the optics set adjacent desired data blocks substantially slows data access.

A disc system may be configured with multiple disc drives. In such a configuration, a control unit operates to determine the location of a desired data block stored on a given disc, and thereby determines the location of the given disc and the associated disc drive unit. The control unit sends a control signal to the specified drive unit to access the desired data block. The drive unit must initially cause the disc to begin rotating to facilitate data access (where the disc is not already rotating). The drive unit then moves the optics sets along the surface of the disc and positions them adjacent the lead-in for the data block to be read.

The time associated with causing the disc to begin rotating until the specified frequency of rotation is achieved and the time associated with properly positioning the disc drive optics set, consequently slows access to the desired data. Furthermore, where the subsequently desired data is contained on another disc, and therefore at another disc drive, the time associated with spin-up and optics set positioning to facilitate the reading of the subsequent data block, further adds to the data access time lag.

Presently, discs may be produced with data stored on both sides (i.e., two-sided discs). Conventional systems, however, are not equipped to access data from both sides of a disc, without having to turn over the disc. The requirement of having to turn over a disc, necessarily involves a device to turn over the disc or the user must manually intervene. In either event, there is a substantial time lag involved.

It is therefore evident that there exists a need in the art for a disc optics system which mitigates time lags associated with recognizing and accessing data stored on discs.

SUMMARY OF THE INVENTION

In accordance with the present invention, a disc optics system for accessing data from one side of a disc is provided with a plurality of optics sets. The optics sets are formed to access data from a disc in response to a control signal and generate a data signal representative of accessed data. The optics sets are positioned at radially variable portions of one side of a disc. The disc optics system is further provided with a multiplexer. The multiplexer is formed to receive data signals from the plurality of optics sets and to selectively output a single data signal in response to a selection signal. The disc optics system is further provided with a controller. The controller is formed to output a control signal to the plurality of optics sets for selectively accessing data from the disc and cause the multiplexer to selectively output a single data signal.

In other embodiments of the present invention, in addition to having more than one optics set on one side of a disc, the disc optics system may be configured with optics sets positioned on each side of a given disc and adjacent multiple discs, and combinations thereof.

In addition, in the disc optics system of the present invention it is preferred that there is provided a memory buffer which is in electronic communication with and disposed between the plurality of optics sets and the multiplexer. The memory buffer has sufficient capacity to facilitate sequencing of the multiplexer output data signal.

Where the disc optics system of the present invention is operated with a disc which contains Table-of-Contents data, the controller is preferably formed to receive such Table-of-Contents data. Further, the controller is formed to correlate respective ones of the plurality of optics sets to physical disc locations of desired data according to the Table-of-Contents data. The controller is formed to output a control signal to respective ones of the plurality of optics sets according to the correlation.

The present invention represents a substantial advance in the art by facilitating the mitigation of time lags associated with data recognition and access. Where a plurality of optics sets facilitates data access from one side of a disc, the time lag associated with initially positioning and subsequently repositioning the optics set adjacent desired data is substantially reduced.

In addition, in the embodiment of the present invention which is used in conjunction with two-sided discs, the time lag associated with having to turn over a disc and subsequently spin-up and reposition the optics set adjacent subsequently desired data is substantially mitigated. Through the utilization of multiplexed optics sets on each side of a disc, upon completion of reading and outputting data from a first side of a disc, because the disc is already rotating at the specified frequency, data from the second side of the disc may be simultaneously accessed and sent to the multiplexer. This configuration, avoids the task of having to turn over the disc, as encountered with conventional systems. Similarly, the task of having to spin-up the disc is avoided. In addition, while data is being accessed from one side of the disc, the optics set on the other side could be positioned, begin accessing data and sending the data to the multiplexer. Upon completion of outputting the initial data the first side of the disc the multiplexer could then rapidly switch to being outputting data from the other side of the disc. Thus, the time lag associated with repositioning the optics set on the second side of the disc is substantially mitigated.

Furthermore, where the present invention is utilized with more than one disc, the multiplexer facilitates that rapid selective output of data from any of the discs.

In addition, in the preferred embodiment of the present invention, a memory buffer is used in conjunction with the multiplexer. The memory buffer facilitates sequencing of the multiplexer output data signal. It is contemplated that the controller may manipulate the accessing and sending of data. The sequence of such data accessing may not be based upon the ultimate desired output sequence from the multiplexer. For example, the sequence for accessing the data may be determined by time efficient considerations. The memory buffer facilitates the ability of the multiplexer to selectively access the buffered data to sequence the data for output. Thus, the memory buffer aids in the mitigation of positioning time lags associated with the optics sets and therefore aids in the mitigation of those deficiencies associated with the prior art optics systems.

In addition, the preferred embodiment of the present invention incorporates the utilization of Table-of-Contents data, in order to facilitate efficient data accessing sequences to further mitigate time lags associated with positioning and repositioning the optics sets.

Accordingly, based upon the forgoing, the present invention represents an advance in the art.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
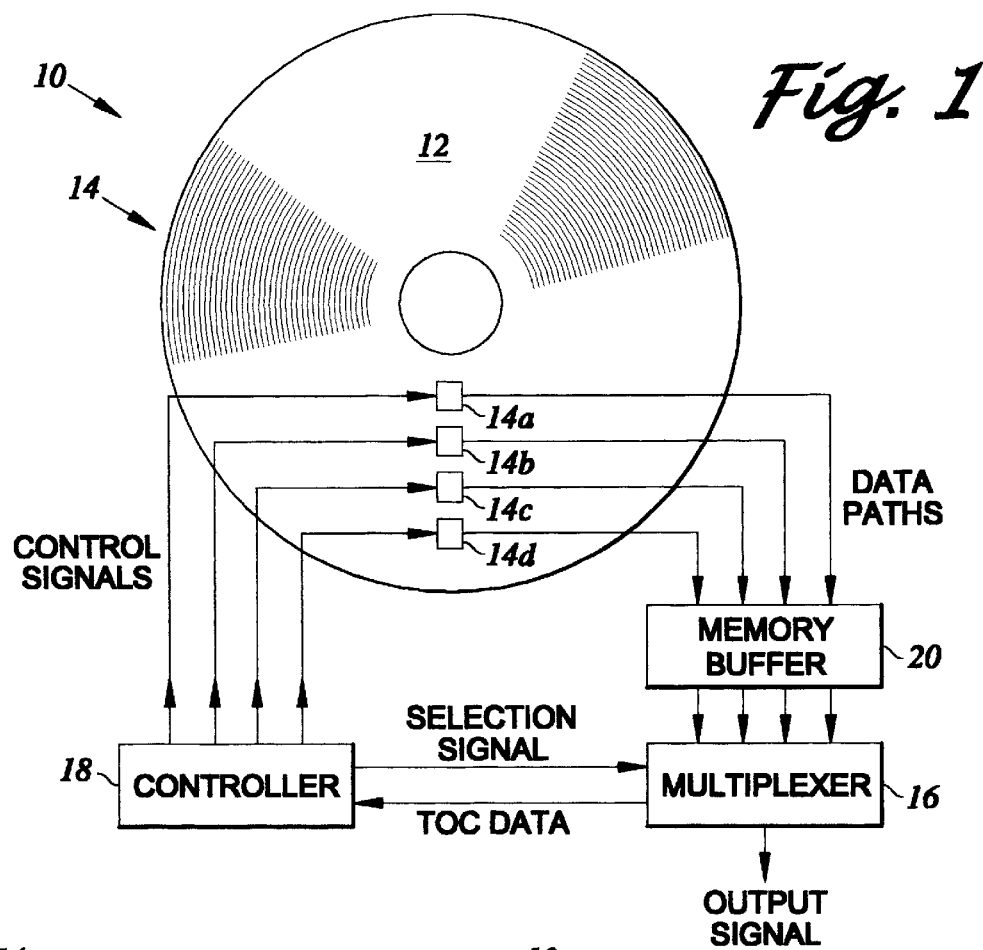
FIG. 1 schematically illustrates a disc optics system of the present invention.

Referring now to the drawings wherein in the showings are for purposes of illustrating a preferred embodiment of the present invention only, and not for purposes of limiting the same, FIG. 1 schematically illustrates a disc optics system 10 for accessing data from one side of a disc 12 is provided with a plurality of optics sets 14. As depicted, individual optics sets are indicated 14a–d. The optics sets are formed to accessed data from a disc 12 in response to a control signal and generate a data signal representative of accessed data. The optics sets 14 are controllably positioned at radially variable portions of one side of a disc 12. It is contemplated that a method and apparatus are chosen from those well known to those of one of ordinary skill in the art to facilitate the responsive movement and positioning of the optics sets 14.

The disc optics system is further provided with a multiplexer 16. The multiplexer 16 is in electronic communication with the plurality of optics sets 14. The multiplexer 16 is formed to receive data signals from the plurality of optics sets 14 and to selectively output a single data signal in response to a selection signal.

The disc optics system 10 is further provided with a controller 18 which is in electrical communication with the plurality of optics sets 14 and the multiplexer 16. The controller 18 is formed to output a control signal to the plurality of optics sets 14 for selectively accessing data from the disc 12 and formed to output a selection signal to the multiplexer 16 for causing the multiplexer 16 to selectively output a single data signal.

Thus, by having multiple optics sets available for control by the controller 18, the controller 18 may choose a particular optics set (e.g., optics set 14a) to read a particular data block. In practice, where subsequently desired data is located in a separate data block on another portion of the disc 12, the controller 18 can choose and assign, via a control signal, another one of the optics sets 14 (e.g., optics set 14b) to the subsequently desired data block. This would be true of other subsequently desired data blocks as well. Thus, while optics set 14a is accessing its assigned data block, optics set 14b can be positioned and begin accessing its assigned data block. The multiplexer 18 receives the accessed data from optics sets 14a and 14b. The multiplexer 18 would output the data from its assigned data block. Upon completion, the multiplexer 18 would rapidly switch to outputting the data accessed from optics set 14b. Thus, the multiplexer 18 facilitates mitigation of optics set repositioning time lag (e.g., the time between completion of a single optics set outputting data from optics set 14a and the optics set having to be repositioned to output data from optics set 14b).

Figure 2A:
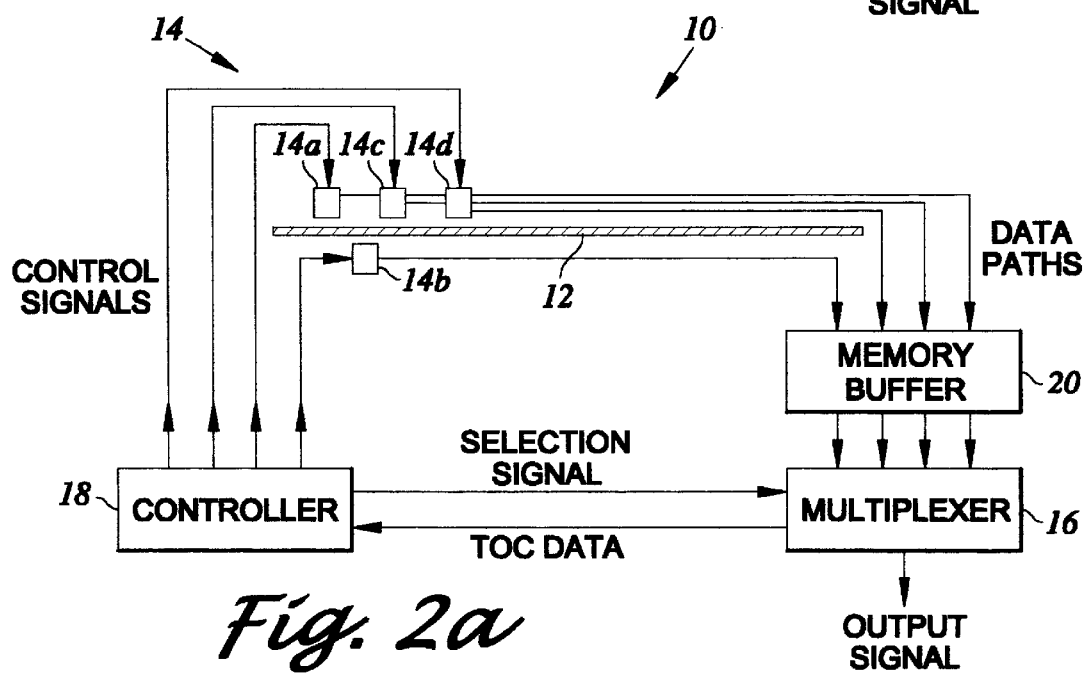
FIGS. 2a and 2b schematically illustrate other embodiments of the disc optics system.

In another embodiment of the present invention, as schematically illustrated in FIG. 2a, the disc optics system 10 may be configured with optics sets positioned on each side of a given disc 12. Through the utilization of multiplexed optics sets 14 on each side of a disc 12, upon completion of reading and outputting data from a first side of a disc, because the disc 12 is already rotating at the specified frequency, data from the second side of the disc may be simultaneously accessed and sent to the multiplexer 18.

Figure 2B:
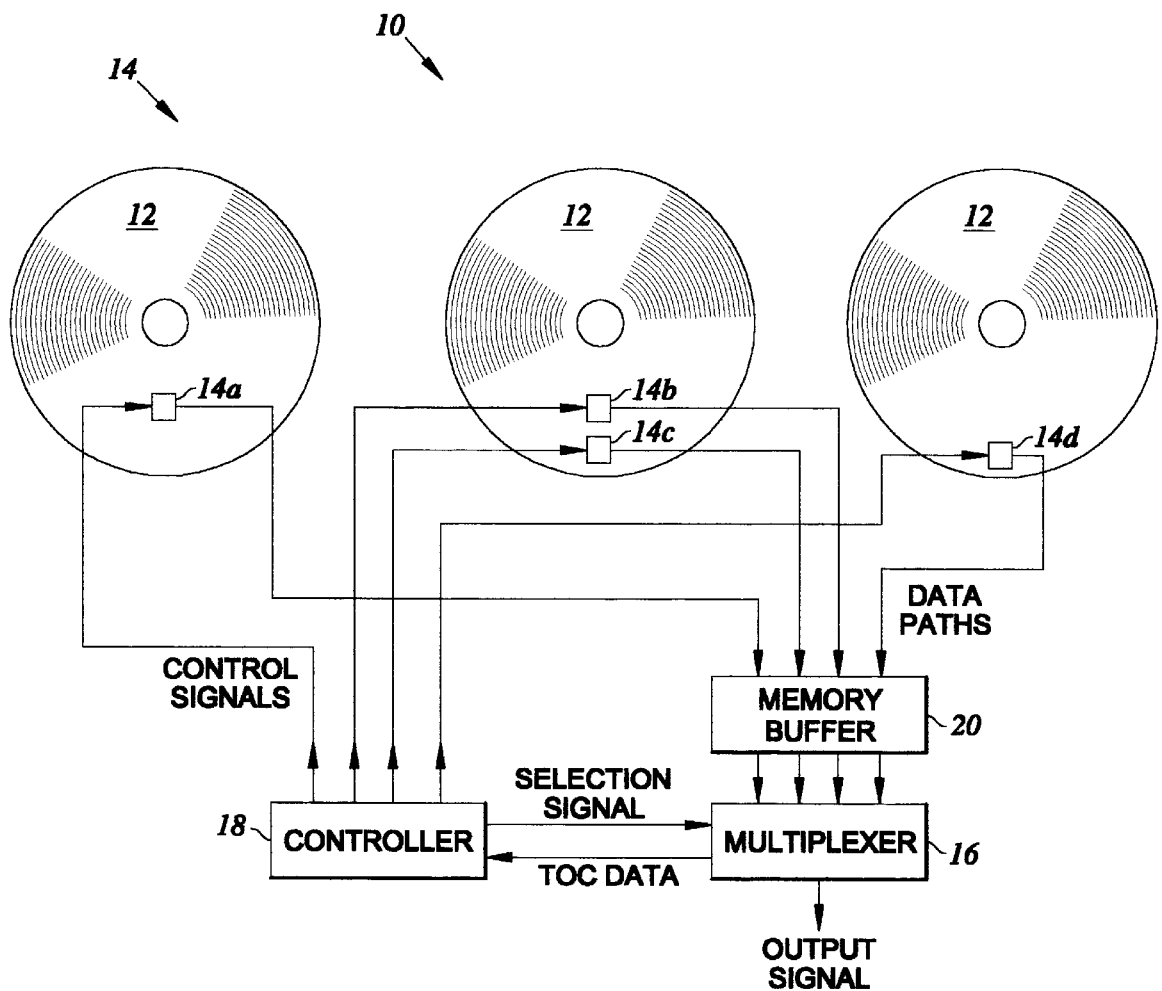

In another embodiment of the present invention, as schematically illustrated in FIG. 2b, the disc optics system 10 may be configured with optics sets positioned adjacent multiple discs (indicated as 12a–c). Thus, the multiplexer 18 facilitates that rapid selective output of data from any of the discs 12a–c.

In addition, the present invention contemplates that multiple optics sets may be configured on a given side of a disc as well as on both sides of a given disc. (an example of such two-sided discs is symbolically depicted in FIG. 2a)

In the preferred embodiment, the optics system 10 is provided with a memory buffer 20 which is in electronic communication with and disposed between the plurality of optics sets 14 and the multiplexer 16. The memory buffer 20 has sufficient capacity to facilitate sequencing of the multiplexer output data signal.

It is contemplated that the controller 18 may manipulate the accessing and sending of data. The sequence of such data accessing may not be based upon the ultimate desired output sequence from the multiplexer 18. For example, the sequence for accessing the data may be determined by time efficient various block of data could be access. The memory buffer 20 facilitates the ability of the multiplexer 18 to selectively access buffered data to sequence the data for output. Thus, the memory buffer 20 aids in the mitigation of positioning time lags associated with the optics sets 14.

Where the disc optics system of the present invention is operated with a disc 12 which contains Table-of-Contents data, the controller 18 is preferably formed to receive such Table-of-Contents data. Further, the controller 18 is adapted to correlate respective ones of the plurality of optics sets 14 to physical disc locations of desired data according to the Table-of-Contents data. The controller 18 is formed to output a control signal to respective ones of the plurality of optics sets 14 according to the correlation. Thus, the preferred embodiment of the present invention incorporates the utilization of Table-of-Contents data, in order to facilitate efficient data accessing sequences to further mitigate time lags associated with positioning and repositioning the optics sets 14.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A disc optics system for accessing data from one side of a disc, the disc containing Table-of-Contents data, the disc optics system comprising:

a plurality of optics sets, formed to access data from a disc in response to a control signal and generate a data signal representative of accessed data, controllably positioned at radially variable portions of one side of a disc;

a multiplexer, formed to receive data signals from the plurality of optics sets, and to selectively output a single data signal in response to a selection signal; and a controller, formed to receive Table-of-Contents data, formed to correlate respective ones of the plurality of optics sets to physical disc locations of desired data according to the Table-of-Contents data, formed to provide an output control signal to respective ones of the plurality of optics sets according to the correlation for selectively accessing data from the disc and for causing the multiplexer to selectively output a single data signal.

2. A disc optics system for accessing data from both sides of a disc, the disc containing Table-of-Contents data, the disc optics system comprising:

a plurality of optics sets, formed to access data from a disc in response to a control signal and generate a data signal representative of accessed data, at least one of the plurality of optics sets controllably positioned on each side of the disc;

a multiplexer, formed to receive data signals from the plurality of optics sets, and to selectively output a single data signal in response to a selection signal; and a controller, formed to receive Table-of-Contents data, formed to correlate respective ones of the plurality of optics sets to physical disc locations of desired data according to the Table-of-Contents data, formed to provide an output control signal to respective ones of the plurality of optics sets according to the correlation for selectively accessing data from the disc and for causing the multiplexer to selectively output a single data signal.

3. A disc optics system for accessing data from a plurality of discs, the discs containing Table-of-Contents data, the disc optics system comprising:

a plurality of optics sets, formed to access data from a disc in response to a control signal, and generate a data signal representative of accessed data, controllably positioned adjacent a corresponding plurality of discs;

a multiplexer, formed to receive data signals from the plurality of optics sets, and to selectively output a single data signal in response to a selection signal; and a controller, formed to receive Table-of-Contents data, formed to correlate respective ones of the plurality of optics sets to physical disc locations of desired data according to the Table-of-Contents data, formed to provide an output control signal to respective ones of the plurality of optics sets according to the correlation for selectively accessing data from the disc and for causing the multiplexer to selectively output a single data signal.

4. A disc optics system for accessing data from multiple two-sided discs, the discs containing Table-of-Contents data, the disc optics system comprising:

a plurality of optics sets, formed to access data from a disc in response to a control signal and generate a data signal representative of accessed data, at least one of the plurality of optics sets controllably positioned on each side of more than one disc;

a multiplexer, formed to receive data signals from the plurality of optics sets, and to selectively output a single data signal in response to a selection signal; and a controller, formed to receive Table-of-Contents data, formed to correlate respective ones of the plurality of optics sets to physical disc locations of desired data according to the Table-of-Contents data, formed to provide an output control signal to respective ones of the plurality of optics sets according to the correlation for selectively accessing data from the disc and for causing the multiplexer to selectively output a single data signal.

5. The disc optics system of claim 1 further comprising a memory buffer, in electronic communication with and disposed between the plurality of optics sets and the multiplexer, having sufficient capacity to facilitate sequencing of the multiplexer output data signal.

6. The disc optics system of claim 2 further comprising a memory buffer, in electronic communication with and disposed between the plurality of optics sets and the multiplexer, having sufficient capacity to facilitate sequencing of the multiplexer output data signal.

7. The disc optics system of claim 3 further comprising a memory buffer, in electronic communication with and disposed between the plurality of optics sets and the multiplexer, having sufficient capacity to facilitate sequencing of the multiplexer output data signal.

8. The disc optics system of claim 4 wherein more than one of the plurality of optics sets being positioned at radially variable portions of one side of one of the discs.

9. The disc optics system of claim 4 further comprising a memory buffer, in electronic communication with and disposed between the plurality of optics sets and the multiplexer, having sufficient capacity to facilitate sequencing of the multiplexer output data signal.

* * * * *